US006398002B1

(12) United States Patent
Choquette et al.

(10) Patent No.: US 6,398,002 B1
(45) Date of Patent: Jun. 4, 2002

(54) POWDER COATED COMBPLATE ASSEMBLY

(75) Inventors: Rob Choquette, Middleton, CT (US); David A. Lacosse, Orland Park, IL (US); Sean M. Mismas, Wallingford, CT (US)

(73) Assignee: Otis Elevator Company, Farmington, CT (US)

( * ) Notice: Subject to any disclaimer, the term of this patent is extended or adjusted under 35 U.S.C. 154(b) by 0 days.

(21) Appl. No.: 09/563,450

(22) Filed: May 1, 2000

(51) Int. Cl.[7] ................................................ B65G 47/66
(52) U.S. Cl. ....................................... 198/325; 198/333
(58) Field of Search .................................. 198/325, 333

(56) References Cited

U.S. PATENT DOCUMENTS 3,687,257 A * 8/1972 Johnson ....................... 198/16
3,972,844 A * 8/1976 Morosawa et al. ........... 260/16
4,236,623 A * 12/1980 Ackert ........................ 198/333
5,370,213 A 12/1994 Ahls et al. .................. 198/325

* cited by examiner

*Primary Examiner*—Dennis H. Pedder
*Assistant Examiner*—Lori L Coletta

(57) ABSTRACT

A combplate assembly for use with a people-moving device, such as an escalator, includes a color powder coating on the comb portion. The powder coating preferably is applied after the comb has been appropriately cleaned. The powder coating preferably is cured so that it is secured to the comb to provide long-lasting visible color. The color coating can be selectively applied to portions of the comb, such as for example, just the fingers. In one example, more than one color coating is utilized.

13 Claims, 2 Drawing Sheets

FIG.2A
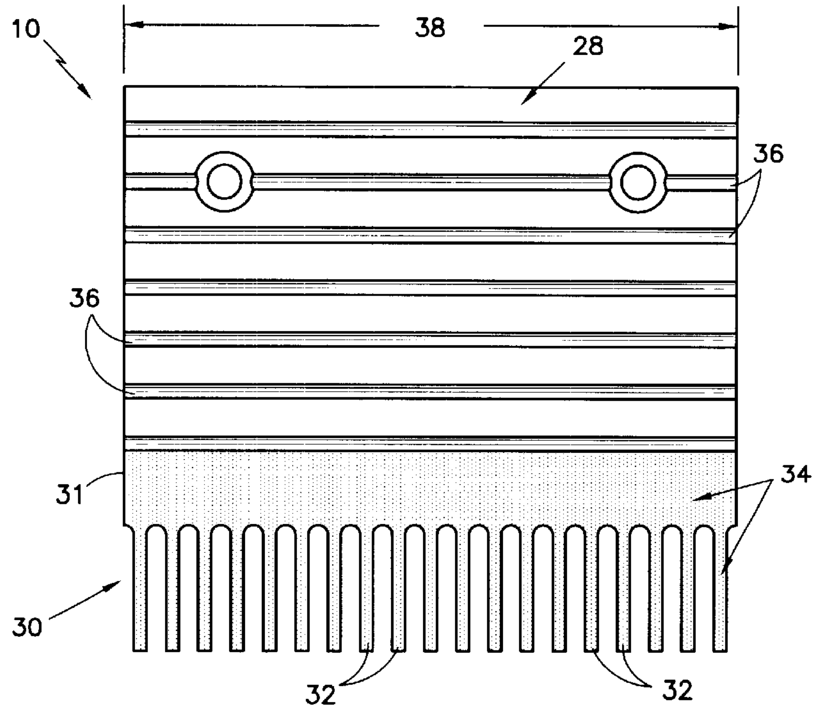
FIG.2B
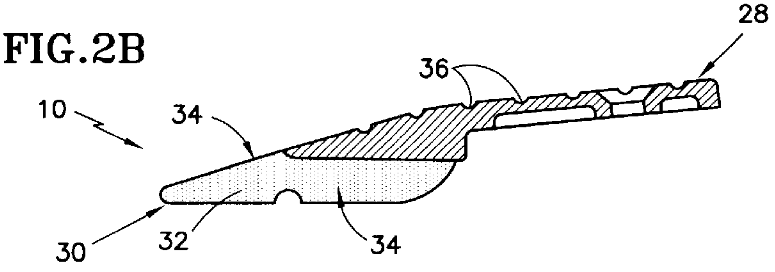
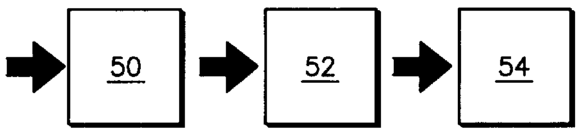
FIG.3

POWDER COATED COMBPLATE ASSEMBLY

BACKGROUND OF THE INVENTION

This invention generally relates to people-moving devices such as escalators. More particularly, this invention relates to combplate assemblies for people-moving devices.

Escalators, moving walkways and other people-moving devices efficiently move a large volume of pedestrian traffic from one place to another. Passengers can simply step on moving steps (or belts, or pallets) and are transported along a path at a constant rate of speed, for example.

In escalators, the steps are attached to a step chain that travels in a closed loop between first and second landings of the escalator. The steps typically exit the first landing and travel toward the second landing while they are exposed so they can be stepped upon by an individual. After reaching the second landing, the steps reverse direction within the system and return to the first landing while concealed within the frame or structure of the system. Near the first landing, the steps again reverse direction and proceed along the pathway from the first landing to the second landing as before.

One issue in designing and providing people-moving devices such as escalators is facilitating convenient and safe entry onto the device and exit from it. Passengers typically go from stepping on a stationary surface (i.e., the floor of a building) onto a moving surface (i.e., one of the steps of an escalator). This transitional point presents an opportunity for an individual to loose her balance.

A number of attempts have been made to address the concern of facilitating a safe transition between the moving surfaces of the device and the adjacent stationary floor surfaces. One attempt has been to provide signs near the entry and exit points of the people-moving device. One difficulty associated with such signs is that they must be positioned outside of the moving path or they hinder the access to the people-moving device. Since the signs are outside of the moving path, their effectiveness is reduced. Additionally, providing signs introduces costs and reduces the aesthetic appearance of the device compared to its surrounding building structure.

Another suggestion has been to paint the landing entry and exit points with cautionary colors to highlight the difference in velocity between the stationary surface and the moving parts. Typical people-moving devices include a combplate assembly at the transition point. It has been suggested to paint the combplate assemblies with appropriate colors.

A major shortcoming of the painting technique is that traffic quickly wears down the paint, which increases maintenance cost and results in a less than finished look.

Another approach has been to add colored plastic inserts that are riveted to the steps of an escalator. A major drawback to this approach is the additional machining requirements and the additional cost added to the steps. Further, there is the possibility for the plastic inserts to become loose, which requires additional maintenance.

One other approach has been suggested in U.S. Pat. No. 5,370,213. In that patent, a polymeric coating is bonded to the combplate. The coating is described in that patent as a plasticized polyvinyl chloride. While this approach has advantages over the two mentioned above, one disadvantage is that it alters the material characteristics of the exposed surface of the combplate, including the friction coefficient. Another drawback to that approach is the associated cost.

Those skilled in the art are constantly striving to make improvements. This invention provides an improved combplate assembly that has enhanced durability and avoids the shortcomings and drawbacks of the previous approaches described above.

SUMMARY OF THE INVENTION

In general terms, this invention is a combplate assembly for use in a people-moving device that has a colored powder coating that is adhered to the comb portion of the assembly. The preferred embodiment includes a polyester-based powder coating that is baked onto the comb portion of the assembly.

A method of coating a combplate assembly according to this invention preferably includes several basic steps. First, the comb is prepared by removing all undesirable debris. The powder coating is then applied and cured to secure it to the comb. In the currently preferred embodiment, a polyester-based powder coating, which is used and is cured by heating the coating at a temperature of approximately 400° F.

The various features and advantages of this invention will become apparent to those skilled in the art from the following detailed description of the currently preferred embodiment. The drawings that accompany the detailed description can be briefly described as follows.

BRIEF DESCRIPTION OF THE DRAWINGS

FIGS. 2*a* and 2*b* illustrate a combplate assembly with a powder coating according to this invention.

FIG. 3 schematically illustrates a method of applying a powder coating to a combplate assembly according to this invention.

DETAILED DESCRIPTION OF THE PREFERRED EMBODIMENT

Figure 1:
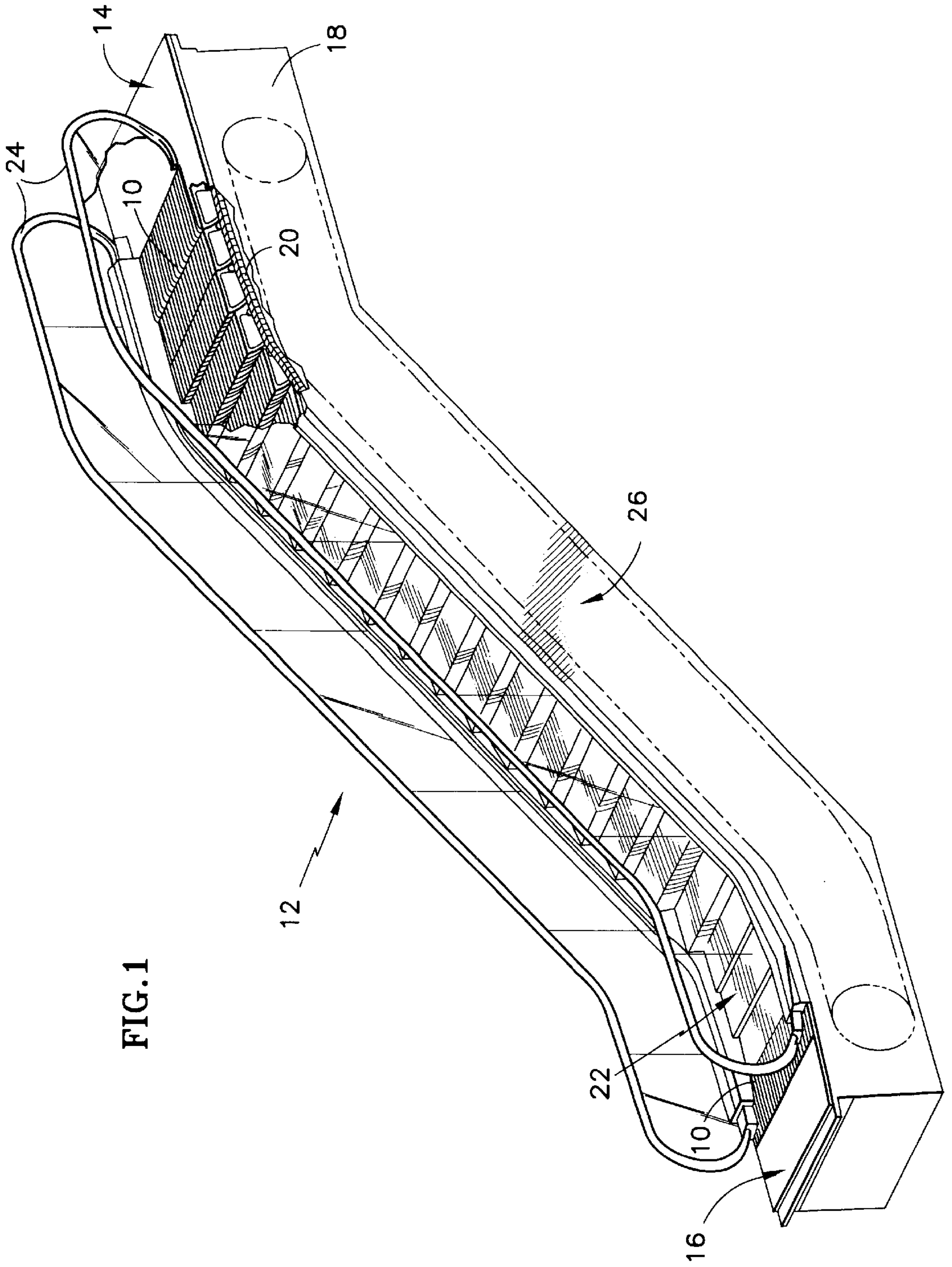
FIG. 1 is a diagrammatic illustration of an escalator system.

FIG. 1 illustrates combplate assemblies 10 at landings of a people-moving device 12. In the illustrated example, the people-moving device 12 is an escalator. This invention applies to other people-moving devices, such as moving walkways, and is not limited to escalators although that is an example shown for purposes of discussion.

The escalator 12 includes a frame 18, a drive (not illustrated), a step chain 20, a plurality of tread plates 22, and a pair of balustrade assemblies 24. The frame 18 includes a first landing 14 and a second landing 16 at opposite ends of an inclined midsection 26. The drive propels the step chain 20 in a closed loop (shown in phantom in FIG. 1) between the two landings. The step chain 20 preferably includes conventional change strands (not illustrated) connected to one another by conventional axles (not illustrated). The tread plates 22 and the axles are driven around the same closed loop as the step chain 20.

Each landing (i.e., at opposite ends of the people-moving device 12) includes a combplate assembly 10 that remains stationary with the stationary floor surface adjacent the landings, respectively. As best seen in FIGS. 2*a* and 2*b*, each combplate assembly 10 has a plate 28, a comb portion 30 and a colored, wear-resistant coating 34. As known, each assembly 10 typically includes multiple comb portions 30. Each comb portion 30 includes a body portion 31 and a plurality of fingers 32, which are the basis for the name of the combplate assembly. The plate 28 can have a plurality of configurations. The illustrated configuration includes a plurality of slots 36 extending laterally across the width 38 of the plate 28. When the combs 30 are assembled with the plate 28, the fingers 32 of the comb 30 extend outwardly, lengthwise from the plate 28 with spacing between each finger.

The colored, wear-resistant coating 34 is a powder coating that is applied directly to the comb portions 30 of the combplate assembly 10. In the preferred embodiment, the combplate assembly 10 is made from aluminum. The powder coating preferably is applied to the entire surface of the comb 30 or selectively applied to just the fingers 32, for example. Additionally, selected surfaces (i.e., a top surface, or only portions of the top surface) or multiple colors (i.e., a first color on a first portion and a second color on another portion) could be used if required. Conventional masking techniques can be utilized to control where the color coating is applied.

FIG. 3 schematically illustrates a method of powder coating the combplate assembly 10. At a first station 50, the comb 30 is prepared to receive the powder coating. Preferably, the comb 30 is cleaned using an alkali solution followed by a phosphate solution. The cleaning is intended to remove all dirt, grease, debris, etc., that may be present on the surfaces of the combplate. These undesirable materials on the comb 30 would otherwise inhibit proper adhesion of the powder coating material 34.

Once clean, the comb 30 is moved to a second station 52 where it is coated with the colored powder coating 34. The preferred embodiment includes using a polyester-based powder coat. Such a powder coating is economic to apply and provides excellent wear characteristics.

At a curing station 54, the powder coating is cured and adhered permanently onto the comb 30. The preferred method of curing includes heating the comb 30 and powder coating 34 for about ten minutes at a temperature of approximately 400° F. With a polyester-based powder coating, this serves to properly set the coating and secure it to the comb.

Other powder coating materials, temperature settings or methods of curing are within the scope of this invention. Further, although three individual "stations" are schematically illustrated in FIG. 3, it is possible to perform the cleaning, application and curing steps all within a single "station" depending on the particular situation.

A combplate assembly having a powder coating according to this invention provides several benefits compared to other attempts at color coding combplate assemblies. The powder coating 34 provides improved aesthetic appearance with greater durability and longer lasting color coating. Moreover, the powder coating method of this invention is much more economical than other methods. Further, the ability to use larger varieties of colors or multiple colors is provided by this invention, which is not possible with other solutions such as anodizing an aluminum material.

The powder coating preferably is applied and set onto the comb portion of the assembly in such a manner that it does not alter the friction and material characteristics of the comb. Different powder coating materials and application and curing variations can be used to achieve desired hardnesses and material characteristics. Given this description, those skilled in the art will be able to select the appropriate settings to achieve an intended result.

The preceding description is exemplary rather than limiting in nature. The currently preferred embodiment has been disclosed but variations and modifications may become apparent to those skilled in the art. Such alterations do not necessarily depart from the spirit and scope of this invention. Therefore, the legal scope of protection provided to this invention can only be determined by studying the following claims.

What is claimed is:

1. A combplate assembly for use with a people-moving device, comprising:

a body portion;

a plurality of fingers extending away from the body portion; and a colored powder coating on the fingers.

2. The combplate assembly of claim 1, wherein the powder coating is a polyester-based material.

3. The combplate assembly of claim 1, including the powder coating on the body portion and the fingers.

4. The combplate assembly of claim 1, including a second colored powder coating on the assembly.

5. A people-moving device, comprising:

a frame portion;

a moveable surface supported by the frame portion, the moveable surface being adapted to carry passengers between landings; and at least one combplate assembly having at least one comb with a body portion and a plurality of fingers extending away from the body portion, the fingers being coated with a colored powder coating, the combplate assembly being positioned at one of the landings.

6. The device of claim 5, wherein the powder coating is a polyester-based material.

7. The device of claim 5, wherein the body portion and the fingers are coated by the colored powder coating.

8. The device of claim 5, including a second colored powder coating on the combplate assembly.

9. A method of coating a combplate assembly for use in a people-moving device, comprising the steps of:

(a) applying a colored powder coating to a comb portion of the combplate assembly; and (b) curing the powder coating so that it is secured to the comb.

10. The method of claim 9, including cleaning the comb before applying the colored powder coating.

11. The method of claim 10, wherein the cleaning step includes cleaning the comb with an alkali solution followed by a phosphate solution.

12. The method of claim 9, including heating the powder coating material at a temperature of approximately 400° F.

13. The method of claim 9, including applying a first color powder coating to a first part of the comb and a second color powder coating to a second part of the comb.

* * * * *